United States Patent [19]

Fukui et al.

[11] Patent Number: 5,325,833
[45] Date of Patent: Jul. 5, 1994

[54] CONTROL APPARATUS FOR INTERNAL COMBUSTION ENGINE

[75] Inventors: Wataru Fukui; Atsuko Hashimoto; Noriaki Hayashi, all of Himeji, Japan

[73] Assignee: Mitsubishi Denki Kabushiki Kaisha, Tokyo, Japan

[21] Appl. No.: 87,266

[22] Filed: Jul. 8, 1993

[30] Foreign Application Priority Data

Jul. 10, 1992 [JP] Japan .................. 4-183902

[51] Int. Cl.⁵ .................. F02P 5/155; F02D 41/04
[52] U.S. Cl. .................. 123/414; 123/419; 123/436
[58] Field of Search ........... 123/414, 419, 436, 612, 123/613, 617

[56] References Cited

U.S. PATENT DOCUMENTS

| | | | |
|---|---|---|---|
| 4,799,469 | 1/1989 | Nagano et al. | 123/419 X |
| 4,953,532 | 9/1990 | Nagano et al. | 123/419 |
| 4,979,487 | 12/1990 | Fukui | 125/643 |
| 4,993,389 | 2/1991 | Ahlborn et al. | 123/436 |
| 5,010,866 | 4/1991 | Ohata | 123/436 |
| 5,086,741 | 2/1992 | Nakamura et al. | 123/419 |
| 5,129,379 | 7/1992 | Kaneyasu et al. | 123/436 |
| 5,140,961 | 8/1992 | Sawamoto et al. | 123/419 |
| 5,156,128 | 10/1992 | Nakagawa | 123/436 |
| 5,233,961 | 8/1993 | Fukui et al. | 123/419 |

Primary Examiner—Willis R. Wolfe
Attorney, Agent, or Firm—Sughrue, Mion, Zinn, Macpeak and Seas

[57] ABSTRACT

An internal combustion engine control apparatus for performing the timing control such as ignition and fuel injection timing control with high accuracy even in a transient operation state such as acceleration or deceleration. A ratio between a first interval period extending from a first reference position to a second reference position and a second interval period extending from a second reference position to the first reference position is determined. A correcting coefficient is calculated on the basis of the ratio. By using this correcting coefficient, the predicted reference position period is calculated, on the basis of which the timing control is performed.

2 Claims, 7 Drawing Sheets

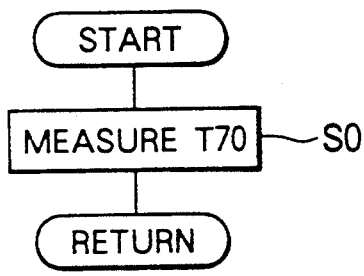
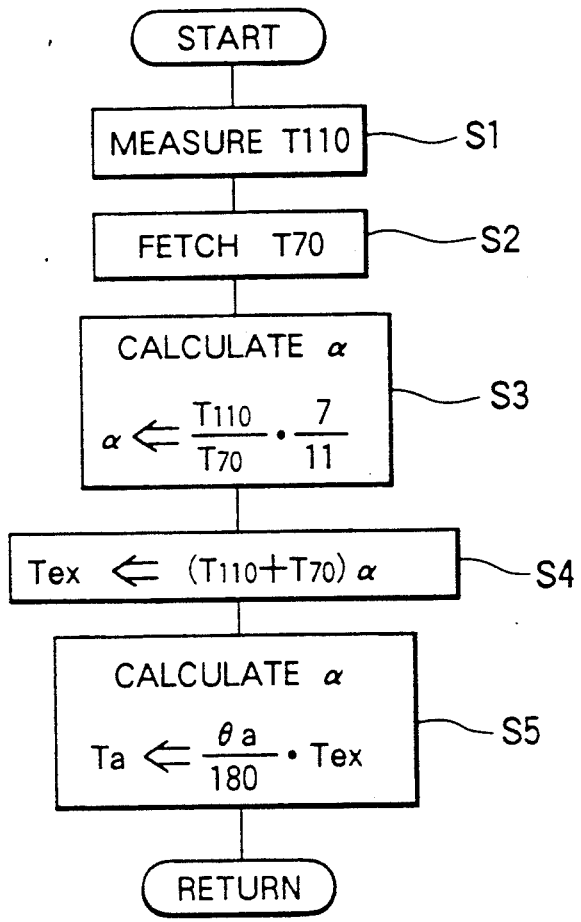

CONTROL APPARATUS FOR INTERNAL COMBUSTION ENGINE

BACKGROUND OF THE INVENTION

1. Field of the Invention

The present invention generally relates to an internal combustion engine control apparatus for controlling the timing such as ignition timing and/or fuel injection timing for each of individual engine cylinders on the basis of a reference position signal indicating first and second reference positions. More particularly, the invention is concerned with an engine control apparatus which can ensure the timing control with high accuracy even when the engine is in the transient operation state.

2. Description of the Related Art

In general, in the internal combustion engines (hereinafter referred to simply on the engine) such as those for automobiles or motor vehicles, there is employed a microcomputer-based control means for calculating the ignition timing and the fuel injection timing for each of the engine cylinders on the basis of reference angular positions of a crank shaft of the engine in order to control optimally the fuel injection timing and the ignition timing while taking into account the operation state of the engine.

The reference positions for such timing control are derived from the reference position signal. In this conjunction, it is noted that in actuality, the timing control is effectuated with a delay corresponding to one interval between the reference position signals from a time point at which the preceding reference position signal was detected. Accordingly, it is desirable to perform the timing control by predicting the succeeding reference position. This is true in particular when the engine is in the transient state of operation such as acceleration and deceleration. In that case, it is desirable or necessary to detect the trend of change in the period of the reference position signal and determine the predicted reference position period for thereby correcting the control timing.

For a better understanding of the present invention, the background technique thereof will first be elucidated.

FIG. 7 is a block diagram showing schematically a structure of an engine control apparatus known heretofore. The control apparatus is comprised of a reference position signal generating means 1 for generating a reference position signal $T\theta$ which indicates first and second reference positions (described later on) on a cylinder-by-cylinder basis in synchronism with the engine speed (rpm), a variety of sensors for detecting operation states D of the engine and denoted generally by a numeral 2, and a control means 3 realized by a microcomputer for controlling the engine operation on the basis of the reference position signal $T\theta$ and the engine operation state signal D.

The control means 3 includes a reference position period measuring part 31 for measuring a reference position period T180 on the basis of the reference position signal $T\theta$, a predicted reference position period calculating part 32 for calculating a succeeding period, i.e., a predicted reference position period Tex on the basis of change or variation in the reference position period T180, and a timing controller 33 for controlling the engine on the basis of the predicted reference position period Tex, the reference position signal $T\theta$ and the engine operation state signal D.

The timing controller 33 recognizes the reference position for each engine cylinder on the basis of the reference position signal $T\theta$ and calculates the control timing (ignition timing, etc) while taking into account the engine operation state D, corrects the control timing on the basis of the predicted reference position period Tex, and outputs a control signal corresponding to the corrected control timing. The control signal outputted from the timing controller 33 is supplied to means for controlling an ignition coil and a fuel injector (not shown).

FIG. 8 is a perspective view showing in concrete an exemplary structure of the reference position signal generating means 1. As can be seen from this figure, this reference position signal generating means 1 is constituted by a signal disk 11 mounted on a cam shaft 10 which is rotated in synchronism with the engine operation. The signal disk 11 includes a number of slits 12 formed coaxially and extending in the direction in which the signal disk 11 is rotated, wherein the number of the slits corresponds to that of the engine cylinders. Each of the slits 12 has a leading edge corresponding to the first reference position and a trailing edge corresponding to the second reference position. Of these slits 12, the one corresponding to a particular one of the cylinders has an offset at the leading edge. A light emission element 13 such as a photodiode and a light receiving element 14 such as a phototransistor are disposed in opposition to each other so that the slits 12 for generating the reference position signal $T\theta$ pass between the elements 13 and 14, which thus cooperate to constitute a photodetector which generates a pulse of the reference position signal $T\theta$ every time the slit 12 passes by.

FIG. 9 is a timing chart showing a waveform of the reference position signal $T\theta$, wherein $T180(n-n)$ represents the preceding reference position period (i.e., period intervening between the first reference positions), while $T180(n)$ represents the current reference position period with a symbol Tex representing the succeeding reference position period as predicted. Each of these reference position periods corresponds to 180° in terms of the crank angle.

The reference position signal $T\theta$ includes a pulse which rises up at the first reference position B75° (meaning the crank angle 75° before the top dead center or TDC) and falls at the second reference position B5°. The first reference position may also be referred to as the maximum angle-of-advance position, while the second reference position may be termed as the initial or angle-of-lag reference position. Each pulse has a duration of "H" level corresponding to 70° in terms of the crank angle.

Next, operation of the conventional engine control apparatus shown in FIG. 7 will be described by reference to FIGS. 8 and 9.

Operation of the engine causes the cam shaft 10 to rotate, as the result of which the reference position signal generating means 1 generates the reference position signal $T\theta$ of such a waveform as shown in FIG. 9. The various sensors denoted collectively by the numeral 2 generate various engine operation state signals such as engine speed (rpm), load and so forth. These signals are inputted to the control means 3 together with the signal $T\theta$.

In the steady state of operation of the engine in which the engine speed remains substantially constant, the timing controller 33 incorporated in the control means 3 calculates the ignition timing and the fuel injection timing on the basis of the reference position signal T$\theta$ and the operation state signal D by using the predicted reference position period Tex as the reference position period T180(n) because the predicted reference position period Tex is equal to the current reference position period T180(n) in the steady operation state of the engine.

By way of example, let's consider the ignition timing control. In a high-speed operation of the engine where the ignition timing has to be controlled with an advanced angle, the timer control of the ignition timing is performed by reference to the first reference position, while in a low-speed operation where the ignition timing is controlled with a lag, the timer control of the ignition timing is carried out by reference to the second reference position B5°. At this juncture, it should be noted that electric power distribution to the individual engine cylinders is realized mechanically through discharge electrodes (not shown) mounted on a rotating shaft.

On the other hand, the reference position period measuring part 31 incorporated in the control means 3 measures the period of the reference position signal T$\theta$ from the first reference position B75° as the reference position period T180. On the other hand, the predicted reference position period calculating part 32 calculates the succeeding reference position period Tex as the predicted reference position period on the basis of the preceding and current reference position periods T180(n−1) and T180(n) in accordance with $$Tex = T180(n) + K\{T180(n) - T180(n-1)\} \quad (1)$$

In the above expression (1), the term "T180(n)−T180(n−1)" represents a deviation $\Delta T$ from the preceding reference position period, and K ($\approx$1) represents a prediction weighting coefficient. The prediction weighting coefficient K is set to an optimal value determined by taking into account the acceleration characteristics and other factors intrinsic to the engine of concern.

As can be seen from the above expression (1), such arrangement may be adopted in which the deviation $\Delta T$ is multiplied by the prediction weighting coefficient, and the product resulting from the multiplication is added to the current period T180(n) for thereby determining the predicted reference position period Tex.

Next, assuming that the engine is in the transient state such as, for example, acceleration state, the current reference position period T180(n) becomes shorter than the preceding period T180(n−1), wherein the difference therebetween is reflected onto the next predicted reference position period Tex.

At this time, an ignition timing control time Ta can be given by $$Ta = (\theta a / 180) Tex \quad (2)$$

where $\theta$a represents a crank angle corresponding to the control time intervening between the reference position for the control and the ignition time point Ta (see FIG. 2).

In this manner, the timing controller 33 calculates the control timing on the basis of the reference position signal T$\theta$ and the operation state D, to thereby output an ultimate control signal corrected on the basis of the predicted reference position period Tex. This control signal represents the control time Ta corrected with the predicted reference position period Tex. Thus, an optimal ignition timing control can be realized.

However, with only the measurement of the reference position period T180, it is impossible to detect variation in the reference position period T180 itself. This in turn means that the engine can not be derived with high accuracy and high efficiency solely by resorting to the measurement of the reference position period T180 only, the reason for which may be explained by the fact that when a rapid or abrupt change occurs in the ratio between a first interval period extending from the first reference position B75° to the second reference position of B5° and a second interval period extending from the second reference position B5° to the first reference position B75°, such rapid change can not be reflected onto the succeeding timing control. Besides, it is difficult to realize a matching of the weighting coefficient K to such rapid change by prediction, which may result in that the timing control signal suffers from error because of the reflection of the predicted reference position period Tex.

As will now be appreciated from the foregoing, the engine control apparatus known heretofore suffers from a problem that the apparatus can not cope with a rapid change in the reference position period T180 because the change in the period of the reference position signal T$\theta$ is corrected by detecting the change in the reference position period T180, whereby the timing control signal is generated on the basis of the reference position signal which suffers from error due to the change or variation mentioned above. Thus, with the known engine control apparatus, it is impossible to realize the control with high accuracy.

SUMMARY OF THE INVENTION

In the light of the state of the art mentioned above, it is an object of the present invention to provide a control apparatus for an internal combustion engine which apparatus can ensure the timing control with high accuracy by correcting the error occurring in the detection of the reference position due to abrupt or rapid changes such as acceleration/deceleration occurring in the transient operation of the engine, with a view to solving the problems which the control apparatus known heretofore suffers.

Another object of the invention is to provide an internal combustion engine control apparatus which can positively prevent error involved in the period measurement for predicting the succeeding reference position from being reflected onto the timing control signal.

In view of the above and other objects which will become apparent as description proceeds, there is provided according to an aspect of the present invention a control apparatus for an internal combustion engine, which apparatus comprises a reference position signal generating means for generating a reference position signal indicative of first and second reference positions of each cylinder in synchronism with rotation of the engine, a period measuring means for measuring predetermined interval periods of the reference position signal, a predicted reference position period calculating means for calculating a succeeding period between reference positions indicative by the reference position signal as a predicted reference position period, a timing control means for correcting a control signal for controlling the engine operation on the basis of the predicted reference position period, and a correcting coefficient calculating means for calculating a period ratio between a first interval period extending from a first reference position to a second reference position and a second interval period extending from the second reference position to the first reference position on the basis of the predetermined interval period, to thereby calculate a correcting coefficient on the basis of the period ratio, wherein the predicted reference position period calculating means calculates the predicted reference position period on the basis of the predetermined period and the correcting coefficient.

With the arrangement of the control apparats described above, the correcting coefficient is calculated on the basis of the ratio between the first and second interval periods measured currently, whereon the engine operation control signal is corrected on the basis of the predicted reference position interval periods calculated by using the correcting coefficient. Consequently, even the error ascribable to a rapid change in the reference position signal can be corrected, whereby the timing control based on the accurate crank angle reference position is made possible.

According to the second aspect of the invention, it is proposed that in the control apparatus described above, an abnormality decision means for generating an abnormality signal when the correcting coefficient mentioned above is deviated from a predetermined range is provided, wherein the timing control means prevents the predicted reference position interval period from being reflected onto the control signal in response to the abnormality signal upon occurrence thereof.

With the arrangement of the control apparatus described above, a change in the interval measured currently is regarded as error when the correcting coefficient assumes an abnormal value, whereby the predicted reference position period as calculated is bypassed and prevented from being reflected onto the control signal. In this manner, erroneous correction of the control signal due to erroneous measurement of the reference position period can be prevented.

The above and other objects, features and attendant advantages of the present invention will more easily be understood by reading the following description of the preferred embodiments thereof taken, only by way of example, in conjunction with the drawings.

BRIEF DESCRIPTION OF THE DRAWINGS

FIG. 3 is a timing chart for illustrating operation of the apparatus according to the first embodiment;

FIG. 4 is a flow chart for illustrating a control signal generating interrupt routine effected by the apparatus according to the first embodiment;

DESCRIPTION OF THE PREFERRED EMBODIMENTS

Now, the present invention will be described in detail in conjunction with preferred or exemplary embodiments thereof by reference to the drawings.

Embodiment 1

Figure 1:
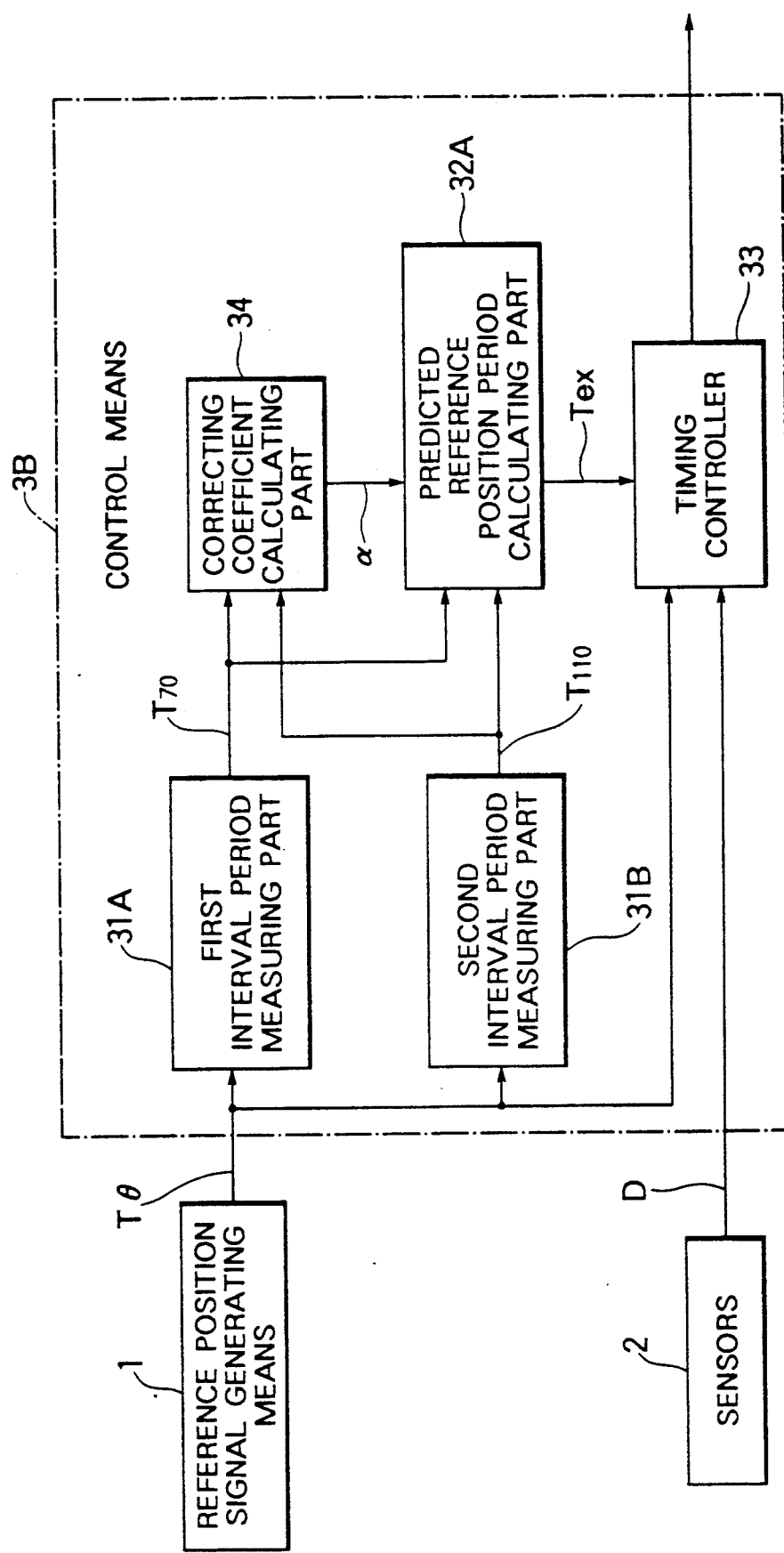
FIG. 1 is a block diagram showing an arrangement of an engine control apparatus according to a first embodiment of the invention.
Figure 7:
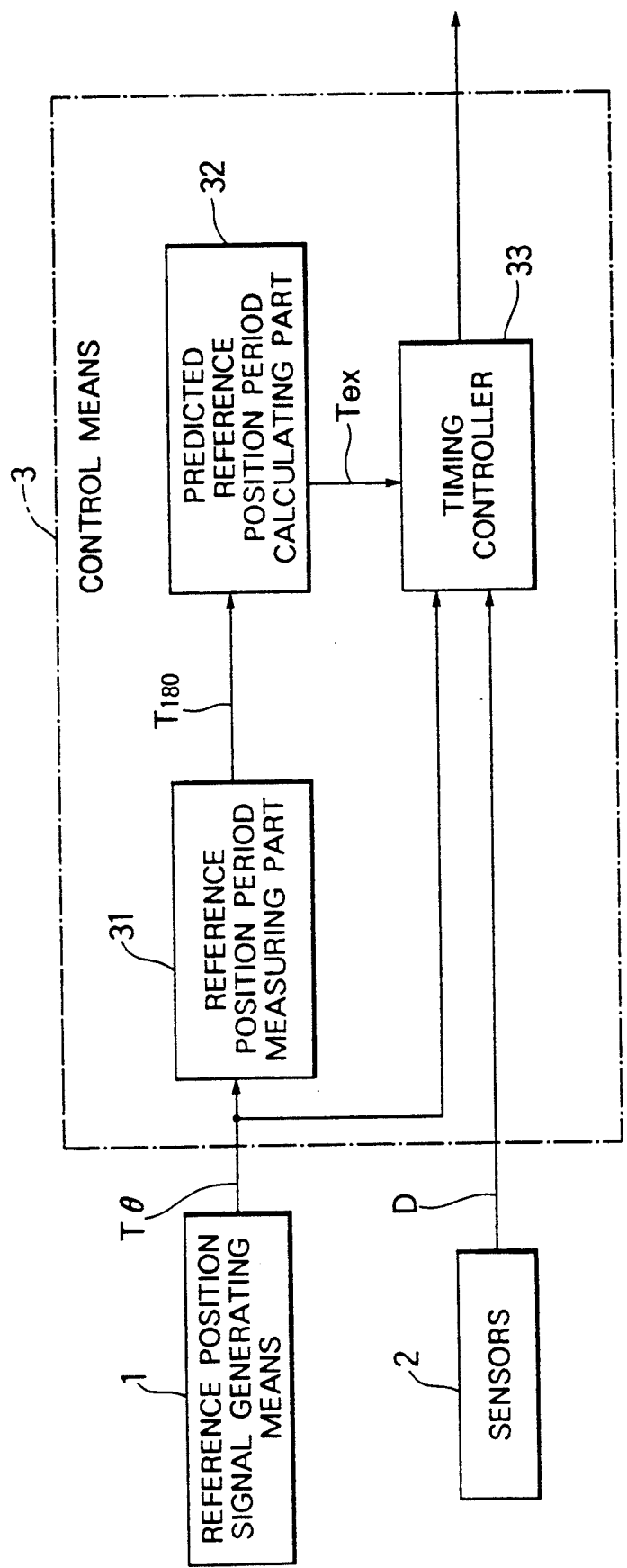
FIG. 7 is a block diagram showing schematically a structure of an engine control apparatus known heretofore.
Figure 8:
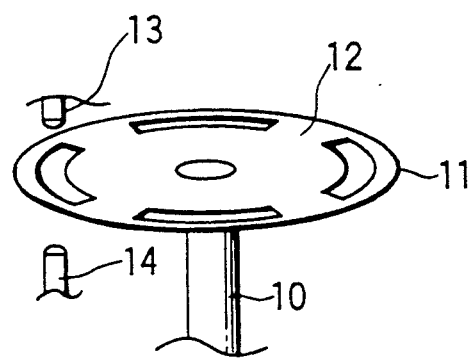
FIG. 8 is a perspective view showing schematically an exemplary structure of a reference position generating means 1.
Figure 9:
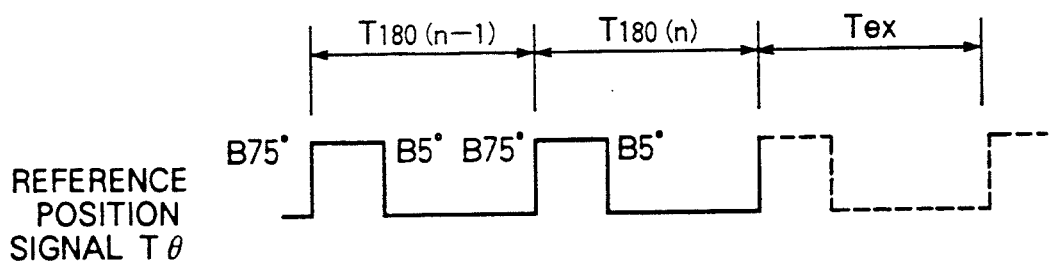
FIG. 9 is a timing chart for illustrating operation of an engine control apparatus known heretofore.

FIG. 1 is a block diagram showing an arrangement of the engine control apparatus according to a first embodiment of the invention. The apparatus is composed of a reference position signal generating means 1, a variety of sensors denoted collectively by a numeral 2 and a control means 3A which includes a timing controller 33. Since the reference position signal generating means 1, the sensors 2 an the timing controller 33 are essentially same as those described hereinbefore by reference to FIG. 7 in respect to the structure and the operation, repeated description thereof will be unnecessary. Further, the physical structure of the reference position signal generating means 1 may be the same as that shown in FIG. 8 and serves to generate a reference position signal $T\theta$ which is similar to that shown in FIG. 9.

The engine control apparatus according to this embodiment further includes a first interval period measuring part 31A, a second interval period measuring part 31B, a predicted reference position period calculating part 32A and a correcting coefficient calculating part 34, all of which are incorporated in a microcomputer-based control means 3A.

The first interval period measuring part 31A serves for measuring a first interval period T70 of the reference position signal $T\theta$ which extends from the first reference position B75° to the second reference position B5° (see FIG. 2), while the second interval period measuring part 31B serves to measure the second interval period T110 which extends from a second reference position B5° to the first reference position B75°. The first and second interval period measuring parts 31A and 31B constitute a so-called period measuring part for measuring the predetermined interval periods of the reference position signal $T\theta$.

The correcting coefficient calculating part 34 serves for calculating a correcting coefficient $\alpha$ on the basis of the predetermined interval periods (i.e., the first interval period T70 and the second interval period T110). More specifically, this correcting coefficient calculating part 34 calculates an interval ratio between the first interval period T70 and the second interval period T110 and determines the correcting coefficient $\alpha$ on the basis of the interval ratio.

On the other hand, the predicted reference position calculating part 32A serves to calculate a predicted reference position period Tex on the basis of the first interval period T70, the second interval period T110 and the correcting coefficient $\alpha$.

Finally, the timing controller 33 serves to generates a control signal for controlling the engine operation on the basis of the reference position signal $T\theta$ and the operation state D, while correcting the control signal by using the predicted reference position period Tex when the engine is in the transient operation state.

Figure 2:
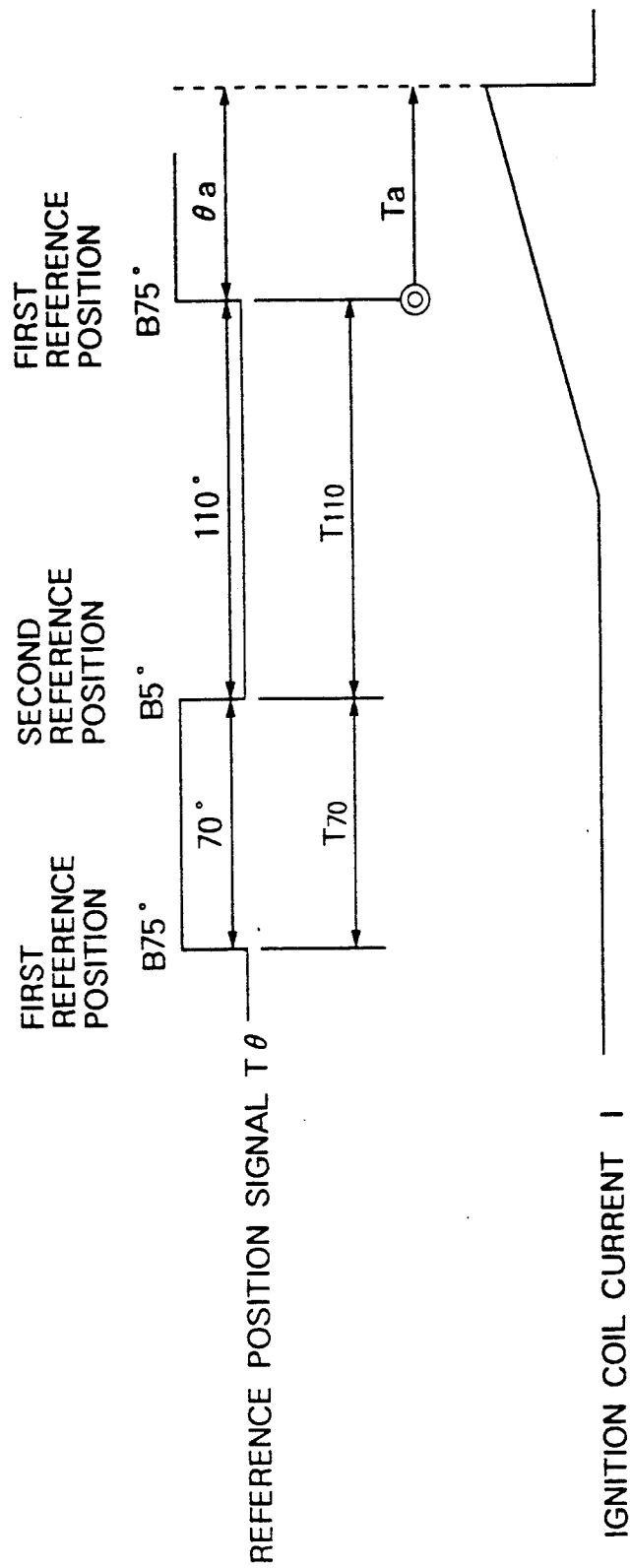
FIG. 2 is a timing chart for illustrating operation of the engine control apparatus according to the first embodiment of the invention.

FIG. 2 is a timing chart for illustrating operation of the engine control apparatus according to the instant embodiment of the invention on the assumption that an ignition control is performed by interrupting an ignition coil current I upon lapse of a control time Ta set in a timer (corresponding to a crank angle $\theta a$) from the first reference position B75°.

The first interval period T70 has a duration of "H" level corresponding to a pulse width or duration of the reference position signal T$\theta$ (corresponding to 70° in terms of the crank angle), while the second interval period T110 has a duration of "L" level (corresponding to 110° in terms of the crank angle).

FIG. 3 is a flow chart illustrating an interrupt routine for measuring the first interval period T70, which is activated in response to the pulse trailing edge of the reference position signal T$\theta$ (i.e., at the second reference position B5°), and FIG. 4 is a flow chart illustrating a control signal generation interrupt routine which is activated in response to the pulse leading edge of the reference position signal T$\theta$ (i.e., at the first reference position B75°).

Next, description will turn to the operation of the engine control apparatus (shown in FIG. 1) according to the instant embodiment by reference to FIGS. 2 to 4.

As the engine operates, the reference position signal T$\theta$ including pulses as shown in FIG. 2 is inputted to the first interval period calculating part 31A and the second interval period calculating part 31B as well as the timing controller 33. Similarly, the operation state signals D derived form the outputs of the various sensors 2 are inputted to the timing controller 33.

On the basis of the reference position signal T$\theta$ and the operation state signal D, the timing controller 33 generates the control signal while correcting the same on the basis of the predicted reference position period signal Tex.

On the other hand, the first interval period calculating part 31A measures the first interval period T70 corresponding to the pulse width or duration at every second reference position B5° of the reference position signal T$\theta$ (step S0). Similarly, the second interval period calculating part 31B measures the second interval period T110 corresponding to the "L" level duration of the reference position signal T$\theta$ at every first reference position B75° (step S1).

Subsequently, in a step (S3), the correcting coefficient calculating part 34 fetches therein the second interval period T110 and the first interval period T70 (step S2) to calculate the correcting coefficient $\alpha$ on the basis of the ratio of duration between the second interval period T110 and the first interval period T70 in accordance with $$\alpha = (T110/T70)(7/11) \tag{3}$$

In the above expression (3), the term (7/11) represents the ratio between the crank angles corresponding to the first interval period T70 and the second interval period T110. The correcting coefficient $\alpha$ assumes a value in a range of 0 (zero) to 2. More particularly, in the steady engine operation, the coefficient $\alpha$ is selected equal to "1". In the acceleration state, $\alpha < 1$ while $\alpha > 1$ in the deceleration state.

In a step S4, the predicted reference position calculating part 32A calculates the predicted reference position period Tex by using the correcting coefficient $\alpha$ in accordance with $$Tex = (T110 + T70) \alpha \tag{4}$$

In the above expression, the term (T110+T70) corresponds to the reference position period T180.

Finally, in a step S5 the timing controller 33 calculates the control time Ta corresponding to the ignition timing corrected by the predicted reference position period Tex in accordance with:

$$\begin{aligned} Ta &= (\theta a/180) \, Tex \\ &= (\theta a/180)(T110 + T70)(T110/T70)(7/11) \end{aligned} \tag{5}$$

Thus, rapid change in the reference position signal T$\theta$ which occurs in the transient operation state can instantaneously be reflected onto the control signal, whereby the timing control can be achieved with high reliability and high accuracy.

A further advantage of the control apparatus can also be seen in that there is no need for setting a prediction coefficient for taking into account the acceleration performance, etc. of the engine.

Embodiment 2

In the case of the first embodiment of the invention described above, the correction of the control signal is performed on the basis of the predicted reference position period Tex independent of the values of the correcting coefficient $\alpha$. It is however desirable to correct the control signal with the predicted reference position period Tex only when the correcting coefficient $\alpha$ assumes a value within a predetermined range for the reason mentioned below. When error is involved in the calculation of the reference position signal T$\theta$ by the first interval period calculating part 31A and the second interval period calculating part 31B due to superposition of noise or other causes, the correcting coefficient $\alpha$ will assume an abnormal value, and reflection of such erroneous correcting coefficient onto the calculation of the predicted reference position period Tex will aggravate the error. With the second embodiment of the invention, it is contemplated to solve this problem.

Figure 5:
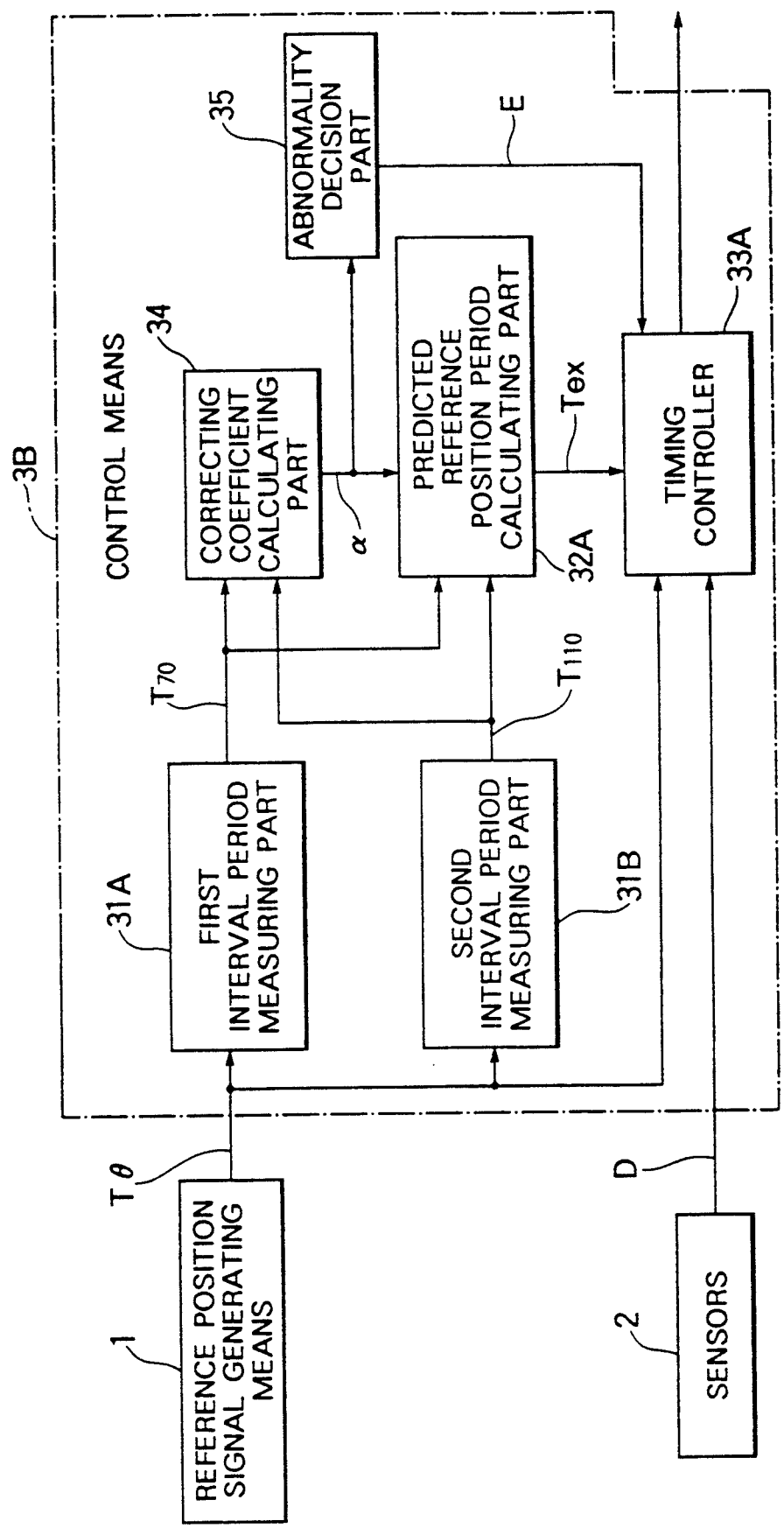
FIG. 5 is a functional block diagram showing an arrangement of the engine control apparatus according to a second embodiment of the invention.

FIG. 5 is a functional block diagram showing an arrangement of the engine control apparatus according to the second embodiment of the invention. As can be seen in this figure, an abnormality decision part 35 is interposed between the correcting coefficient calculating part 34 and a timing controller 33. When abnormality of the correcting coefficient $\alpha$ is decided by the correcting coefficient calculating part 34, an abnormality signal E is generated for invalidating the predicted reference position period signal Tex. More specifically, the timing controller 33 is so designed as to respond to the input of the abnormality signal E by bypassing the predicted reference position period Tex so that it is not reflected onto the control signal.

Figure 6:
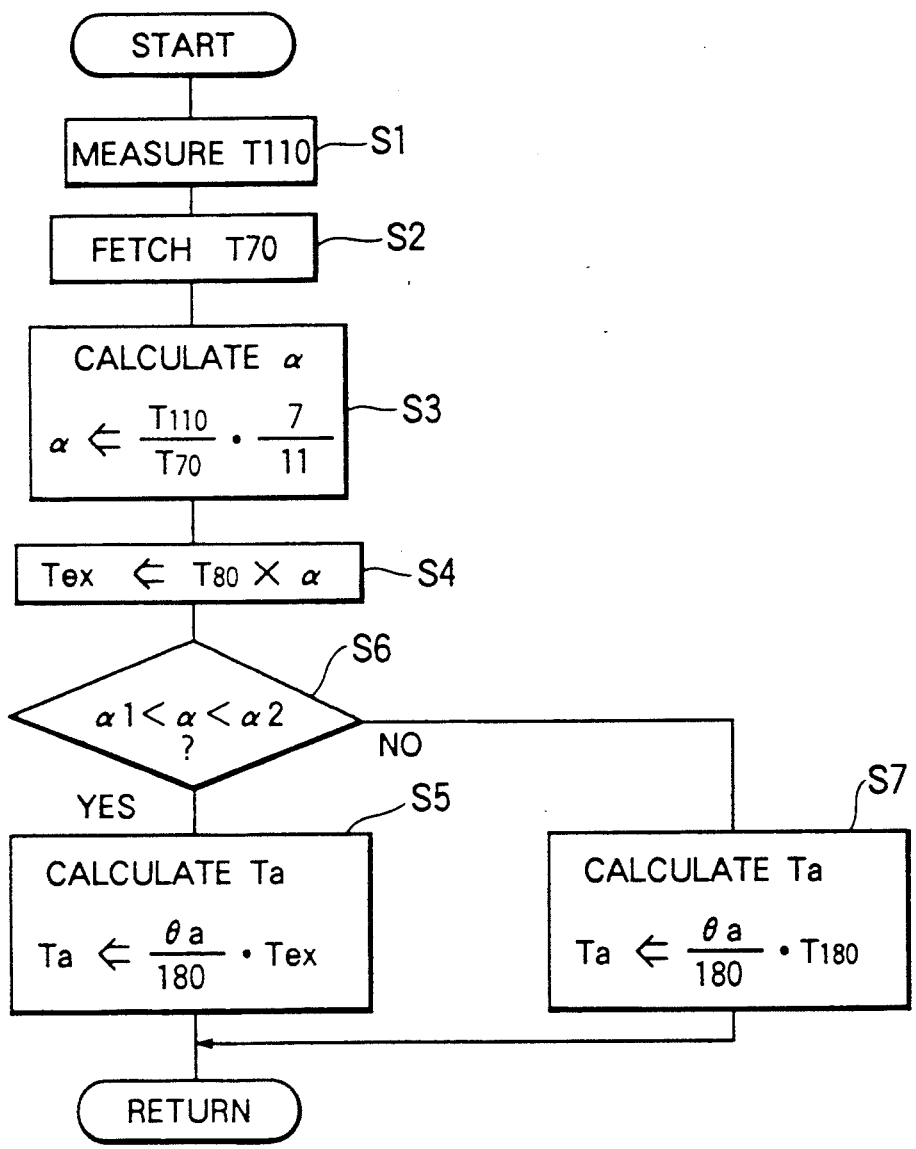
FIG. 6 shows a flow chart for illustrating operation of the engine control apparatus according to the second embodiment.

FIG. 6 shows a flow chart for illustrating operation of the engine control apparatus according to the second embodiment, wherein S1 to S3 and S5 designate the same steps as those denoted by like reference symbols in FIG. 4. The routine shown in FIG. 6 is activated by interruption at every first reference position B75°, as in the case of the routine shown in FIG. 4.

Now, operation of the engine control apparatus according to the instant embodiment will be described by reference to FIG. 6.

The correcting coefficient calculating part 34 calculates the correcting coefficient α on the basis of the ratio between the first interval period T70 and the second interval period T110 in accordance with the expression (3) in a step S3, while the predicted reference position calculating part 32A calculates the predicted reference position period Tex on the basis of the reference position period T180 and the correcting coefficient α in accordance with the expression (4) in a step S4.

On the other hand, the abnormality decision part 35 compares the correcting coefficient α with a lower limit value α1 and an upper limit value α2 to determine whether the correcting coefficient α lies within a predetermined range of α1 and α2 (step S6). Since the correcting coefficient α varies about the center value of "1", the lower limit α1 may be set to 0.5 (or zero) with the upper limit α2 being set to 1.5 (or 2). So long as the correcting coefficient α lies within the predetermined range (i.e., when α1<α<α2), no abnormality signal E is generated. Consequently, the timing controller 33 calculates the control time Ta on the basis of the predicted reference position period Tex in accordance with the expression (5) in a step S5.

On the other hand, when the correcting coefficient α is deviated from the predetermined range (i.e., when α≦α1 or α2≦α), the abnormality signal E is generated. In response to this abnormality signal E, the timing controller 33 bypasses or neglects the predicted reference position period Tex and calculates the control time Ta without correction on the basis of only the reference position period T180 in accordance with the undermentioned expression (step S7).

$$Ta = (\theta a/180) T180 \qquad (6)$$

In the above expression (6), the reference position period T180 may be determined as a sum of the first interval period T70 and the second interval period T110.

As is apparent form the above, when an abnormal correcting coefficient α is calculated due to error in the measurement, the predicted reference position period Tex calculated on the basis of the error-suffering correcting efficient is positively prevented from being reflected onto the control signal. Thus, the control error, if any, can be eliminated or suppressed to a minimum.

Embodiment 3

In the case of the second embodiment, the control time Ta is calculated on the basis of the reference position period which is not corrected by the period ratio in the predicted reference position period bypassing step S7 upon decision of abnormality of the correcting coefficient α. However, the calculation of the control time Ta may be omitted with the ignition timing being fixed. In that case, the ignition control may be replaced by a forcive ignition control based on the second reference position B5° as in the case of the cranking operation.

Embodiment 4

In the second embodiment, the upper limit value α1 and the lower limit value α2 for the correcting coefficient α are used in the abnormality decision step S6. However, the abnormality decision may be made to the substantially same effect by comparing a deviation from the correcting coefficient value "1" with a predetermined value β in accordance with $$|\alpha - 1| < \beta. \qquad (7)$$

In the above expression (7), β represents difference between "1" (one) and the upper limit value or the lower limit value of the correcting coefficient and is given by $$\beta = 1 - \alpha 1 = \alpha 2 - 1.$$

When the condition represented by the expression (7) applies valid, decision is made that the correcting coefficient is normal and, if otherwise, it is decided as being abnormal.

Embodiment 6

In the second and the third embodiments of the invention, the predetermined interval period measuring part is composed of the first interval period calculating part 31A and the second interval period calculating part 31B, wherein the period ratio is determined by using directly the first interval period T70 and the second interval period T110 in the correcting coefficient calculating part 34. However, the period ratio may be calculated by using other predetermined interval period. For example, by measuring the first interval period T70 and the reference position period T180, the second interval period T110 may be determined by subtracting the first interval period T70 from the reference position period T180. In this case, since the reference position for measuring the periods T70 and T180 is limited to only the first reference position B75°, error possibly involved in the measurement can be made small when compared with the case where the reference position for measuring the second interval period T110 is set at the second reference position B5°, whereby the accuracy in the calculation of the period ratio can be enhanced.

Many features and advantages of the present invention are apparent form the detailed specification and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

We claim:

1. A control apparatus for an internal combustion engine, comprising:
   reference position signal generating means for generating a reference position signal representing a first reference position and a second reference position for each cylinder of said engine in synchronism with operation of said engine;
   period measuring means for measuring predetermined interval periods of said reference position signal;
   predicted reference position period calculating means for calculating a succeeding period of said reference position signal as a predicted reference position period;
   timing control means for correcting a control signal for controlling operation of said engine on the basis of said predicted reference position period; and
   correcting coefficient calculating means for calculating a ratio between a first period extending from said first reference position to said second reference position and a second period from said second reference position to said first reference position on the basis of said predetermined interval period, to thereby calculate a correcting coefficient on the basis of said ratio;

wherein said predicted reference position period calculating means calculates said predicted reference position period on the basis of said predetermined period and said correcting coefficient.

2. An engine control apparatus according to claim 1, further comprising:

abnormality decision means for generating an abnormal signal when said correcting coefficient exceeds a predetermined range;

wherein said timing control means responds to said abnormality signal to thereby prevent said predicted reference position from being reflected onto said control signal.

* * * * *